US011891844B2

(12) United States Patent
Lee

(10) Patent No.: US 11,891,844 B2
(45) Date of Patent: Feb. 6, 2024

(54) TWO WAY SWINGING DOOR OPENING GAP CONTROL DEVICE FOR CONTROLLING MOVEMENT OF COMPANION ANIMAL

(71) Applicant: Sang Choon Lee, Daegu (KR)

(72) Inventor: Sang Choon Lee, Daegu (KR)

( * ) Notice: Subject to any disclaimer, the term of this patent is extended or adjusted under 35 U.S.C. 154(b) by 255 days.

(21) Appl. No.: 17/380,495

(22) Filed: Jul. 20, 2021

(65) Prior Publication Data

US 2022/0034132 A1 Feb. 3, 2022

Related U.S. Application Data

(63) Continuation of application No. PCT/KR2020/014372, filed on Oct. 21, 2020.

(30) Foreign Application Priority Data

Jul. 30, 2020 (KR) ........................ 10-2020-0095272

(51) Int. Cl.
*E05C 17/46* (2006.01)

(52) U.S. Cl.
CPC .................................... *E05C 17/46* (2013.01)

(58) Field of Classification Search
CPC ........ E05C 17/46; E05C 17/042; E05C 17/36; E05C 17/30; E05C 17/24; E05C 9/04;
(Continued)

(56) References Cited

U.S. PATENT DOCUMENTS 1,588,477 A * 6/1926 Kingston ................ E05C 17/36 16/82
2,187,941 A * 1/1940 King ....................... E05C 17/36 292/262

(Continued)

FOREIGN PATENT DOCUMENTS

JP 2003-307068 A 10/2003
JP 3123149 U 7/2006

(Continued)

OTHER PUBLICATIONS

Door Buddy, Door Buddy ,Door Latch Plus Door Stopper, 2019 https://www.thedoorbuddy.com/products/door-buddy-door-latch-plus-door-stopper (Year: 2019).*

(Continued)

*Primary Examiner* — Christine M Mills
*Assistant Examiner* — Faria F Ahmad
(74) *Attorney, Agent, or Firm* — NKL Law; Jae Youn Kim

(57) ABSTRACT

Disclosed is a two way swinging door opening gap control device for controlling the movements of companion animals that is detachably attached to the existing door and door frame with ease, without any structural change or damage, thereby being applied conveniently to various types of doors, and that controls an opening gap of the door to allow the companion animals to freely enter through the door, to prevent the door from being excessively opened by external wind or animals entering therethrough, and to limit the spaces the animals can enter according to animal sizes to thus provide individual living spaces for the animals. According to the present invention, the opening gap control device largely includes a gap control band 100, a locking pin module 200, and a locking holder module 300.

6 Claims, 7 Drawing Sheets

(58) Field of Classification Search
CPC .... E05C 17/365; Y10T 292/67; Y10T 292/34; Y10T 292/73; Y10T 292/28; Y10T 292/228; E05B 83/16; E05B 79/20; E05B 53/003; Y10S 292/43; Y10S 292/42; Y10S 292/31; Y10S 292/14
See application file for complete search history.

(56) References Cited

U.S. PATENT DOCUMENTS

| | | | | | |
|---|---|---|---|---|---|
| 2,199,369 | A * | 4/1940 | Bernstein | E05C 17/36 | 292/288 |
| 4,062,583 | A * | 12/1977 | Taylor | E05C 17/30 | 296/76 |
| 4,188,061 | A * | 2/1980 | Shehi | E05C 17/36 | 296/76 |
| 4,191,413 | A * | 3/1980 | Barner | E05C 17/36 | 24/302 |
| 5,297,828 | A * | 3/1994 | Chung | E05C 17/36 | 292/262 |
| 9,938,757 | B2 * | 4/2018 | Raffi | E05C 19/188 | |
| 9,956,995 | B1 * | 5/2018 | Neighbors | B62D 33/0273 | |
| 10,214,948 | B2 * | 2/2019 | Richmond | E05C 5/02 | |
| 10,316,556 | B2 * | 6/2019 | Richmond | E05C 21/00 | |
| 10,634,060 | B2 * | 4/2020 | Song | B64D 29/06 | |
| 2012/0217762 | A1 * | 8/2012 | Bruce | E05C 17/042 | 292/253 |
| 2013/0056998 | A1 * | 3/2013 | Chincarini, Jr. | E05C 17/36 | 292/262 |
| 2013/0334828 | A1 * | 12/2013 | Bruce | E05C 17/36 | 292/288 |
| 2015/0150341 | A1 * | 6/2015 | Singh | A44B 11/006 | 24/303 |
| 2016/0037868 | A1 * | 2/2016 | Lambert | A44B 11/25 | 24/303 |
| 2016/0037879 | A1 * | 2/2016 | Qian | A41F 1/002 | 24/3.2 |
| 2016/0040698 | A1 * | 2/2016 | Perkins | A44B 11/2596 | 24/664 |
| 2016/0145918 | A1 | 5/2016 | Liang et al. | | |
| 2017/0211301 | A1 * | 7/2017 | Richmond | E05B 63/18 | |
| 2017/0234340 | A1 * | 8/2017 | Pensak | F16B 11/006 | 24/3.1 |
| 2018/0238085 | A1 * | 8/2018 | Richmond | G08B 25/10 | |
| 2022/0025684 | A1 * | 1/2022 | Kroll | E05C 17/36 | |

FOREIGN PATENT DOCUMENTS

| | | | |
|---|---|---|---|
| JP | 2015-134994 | A | 7/2015 |
| KR | 20-1997-0005238 | U | 2/1997 |
| KR | 20-2010-0007869 | U | 8/2010 |

OTHER PUBLICATIONS

Door Buddy Installation Guide; Archived on Jan. 13, 2019; https://www.thedoorbuddy.com/pages/intallation-guide (Year: 2019).*

* cited by examiner

TWO WAY SWINGING DOOR OPENING GAP CONTROL DEVICE FOR CONTROLLING MOVEMENT OF COMPANION ANIMAL

CROSS REFERENCES TO RELATED APPLICATION OF THE INVENTION

This application is a continuation of PCT/KR2020/014372, filed Oct. 21, 2020, the entire disclosure of which is incorporated herein by reference.

TECHNICAL FIELD

The present invention relates to a two way swinging door opening gap control device for controlling the movements of companion animals, and more particularly, to a two way swinging door opening gap control device for controlling the movements of companion animals that is configured to control the opening gap of the door to restrict the sizes of the companion animals entering through the door, thereby providing individual living spaces according to the animal sizes and protecting small-sized animals from large-sized animals, and especially configured to set or release a door opening control state through simple control like a single touch.

BACKGROUND ART

As today is the age of nuclear family, the number of family members as well as the conversation or fellowship between the family members becomes reduced, and since a lot of people spend a lot of time alone, accordingly, they raise companion animals like dogs, cats, and so on so as to relieve their loneliness, obtain their psychological stability, and feel a sense of closeness to the companion animals. Recently, companion animals of different species and sizes have been raised together in one family.

In this case, generally, the companion animals freely go into and out of rooms, while following their owner, and if a door is closed, they often scratch or damage the door with their claws or teeth so as to go through the door for their feces and urine, food, or play. Accordingly, the door is open to a degree allowing them to enter therethrough, but in the process where they enter through the door, the door is completely pushed so that it becomes frequently open to a degree that is not desired by their owner. As a result, cooling and heating efficiencies may be remarkably lowered in the seasons requiring cooling and heating.

In the case where a number of companion animals live together, further, it is desirable that the respective living spaces of the companion animals are provided to decrease the fights among them. If the door is always open, however, they may freely move through the open door, they may fight easily, and in particular, if there are fights among the companion animals in the absence of their owner, small-sized animals may be injured because they cannot move to a safe place.

So as to solve such problems, a conventional technology is disclosed in Korean Utility Model Application No. 20-2010-0007869 wherein an interior door for companion animals is configured to have an upward and downward sliding panel located on the lower portion of a door to thus allow the companion animals to freely enter through the door in a state where the door is closed, thereby removing the inconveniences in always opening the door and in advance preventing the door from being damaged by the companion animals.

According to the conventional technology, however, the lower end portion of the door is incised to provide any separate door for the companion animals, and accordingly, the existing door may be incised and deformed or exchanged with a new door, thereby being undesirably complicated in construction and lowering the conveniences in changing the door structure. When considering the companion animals having different sizes according to their species, ages, and growing states, further, it is not easy to determine the size of the door for the companion animals in accordance with the sizes of the companion animals, thereby failing to provide the individual living spaces only for the companion animals of given sizes or more.

DISCLOSURE

Technical Problem

Accordingly, the present invention has been made in view of the above-mentioned problems occurring in the related art, and it is an object of the present invention to provide a two way swinging door opening gap control device for controlling the movements of companion animals that can be configured to be available in right and left directions, that is, in both directions, without having any influence on the opening direction of a door, and in particular, to provide the opening gap control device that can be configured to improve a locking structure where a locking pin module is locked and released onto and from a locking holder module at a given angle, thereby ensuring stability in keeping a locking state to thus prevent the door from being forcedly opened by smart animals among the companion animals.

Technical Solution

To accomplish the above-mentioned objects, according to the present invention, there is provided a two way swinging door opening gap control device for controlling the movements of companion animals so as to control an opening gap between a door and a door frame to thus prevent the companion animals of given sizes or more from entering through the opening gap, the device including: a gap control band whose one end is located on the door and length is adjustable; a locking pin module located on the other end of the gap control band and having a pair of upper and lower pins; and a locking holder module located on the door frame and having upper and lower holders adapted to restrict the upper and lower pins of the locking pin module thereto.

In this case, the locking pin module may include a handle having a band fastening portion formed on one end thereof, a locking piece protruding from the handle and having a smaller size than a height of the handle, and the upper and lower pins extended in a vertical direction from the locking piece in such a manner as to be integrally connected to each other.

In this case, the locking holder module may include a fixed plate mounted on the door frame, the upper and lower holders protruding from the fixed plate in such a manner as to be spaced apart from each other and having upper and lower pin holes for restricting the upper and lower pins thereto, a locking groove formed between the upper and lower holders to restrict the locking piece thereto, and a slot formed by incising the upper holder to permit a longitudinal movement of the locking piece.

Further, if the locking piece swings at an angle that does not correspond to the slot in the state where the upper and lower pins of the locking pin module are coupledly fitted to the upper and lower holders of the locking holder module, the locking piece is restrictedly inserted into the locking groove.

Moreover, in an installation condition where the locking holder module is located on the right side and the gap control band and the locking pin module are located on the left side, the lower pin is inserted into the lower holder, and in an installation condition where the locking holder module is located on the left side and the gap control band and the locking pin module are located on the right side, the upper pin is inserted into the lower holder, so that the installation condition is varied to selectively insert the upper and lower pins into the lower holder to thus allow the single locking pin module to be provided for use in both direction installation conditions.

Further, the thickness of the locking piece is smaller than the diameter of the upper pin, and the width of the slot is smaller than the diameter of the upper pin, so that the slot permits the locking piece to move in a longitudinal direction thereof but restricts the movement of the upper pin in a transverse direction thereof.

Further, the upper pin hole is provided with a magnetic material mounted on the bottom thereof, and the lower pin or the upper pin is provided with a passive magnetic material mounted on the lower periphery thereof in such a manner as to be attached to the magnetic material by means of a magnetic force.

Moreover, the lower holder has a locking groove formed on the contact surface coming into contact with the locking piece, and the locking groove engages with the locking piece at a given angle.

Advantageous Effects

According to the present invention, the two way swinging door opening gap control device for controlling the movements of companion animals is configured to be available in right and left directions, that is, in both directions, without having any influence on the opening direction of the door, and in particular, the opening gap control device is configured to improve the locking structure where the locking pin module is locked and released onto and from the locking holder module at a given angle, thereby ensuring stability in keeping the locking state to thus prevent the door from being forcedly opened by smart animals among the companion animals.

MODE FOR INVENTION

Hereinafter, the present invention will be in detail described with reference to attached drawings.

The present invention relates to a two way swinging door opening gap control device for controlling the movements of companion animals. So as to set and release the opening gap of the door through simple control like a single touch, the two way swinging door opening gap control device according to the present invention largely includes a gap control band 100, a locking pin module 200, and a locking holder module 300.

Figure 1:
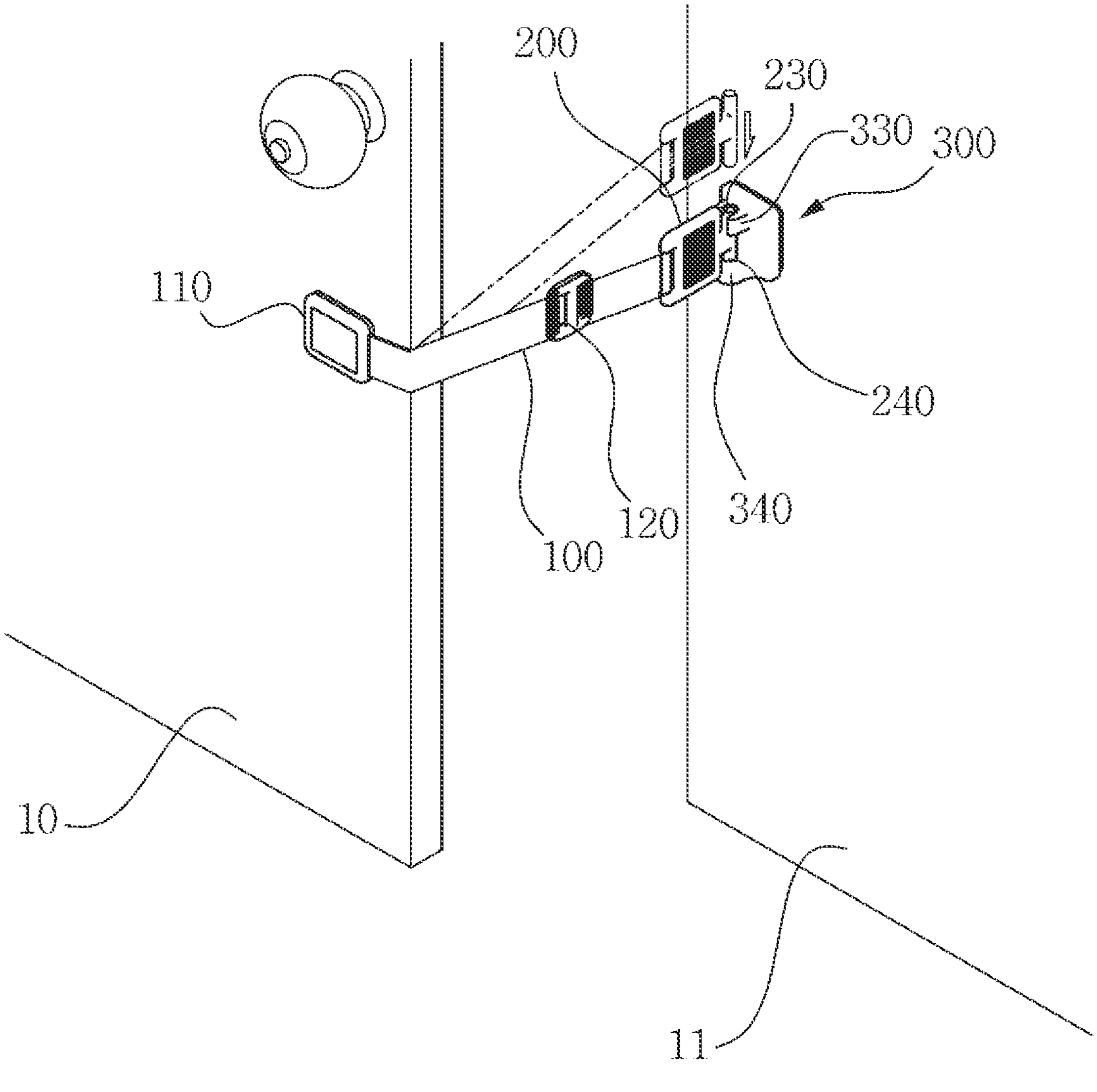
FIG. 1 is a perspective view showing a use state of a two way swinging door opening gap control device for controlling the movements of companion animals according to an embodiment of the present invention.

According to the present invention, the two way swinging door opening gap control device for controlling the movements of companion animals is configured to control an opening gap between a door 10 and a door frame 11 to thus prevent the companion animals of given sizes or more from entering through the opening gap. As shown in FIG. 1, the gap control band 100, which serves to control the opening gap of the door 10, has one end located on one side surface of the door 10, and in this case, generally, the gap control band 100 is made of a fabric string or synthetic resin band.

So as to allow the gap control band 100 to be mounted on the door 10, a fixing bracket is connected to one end portion of the gap control band 100, and the fixing bracket is fixed to the door 10 through fixing means like an adhesive, bolt, magnet, and suction pad.

Further, length adjusting means 120 like a buckle is mounted on the gap control band 100. Through the length adjusting means 120, the gap control band 100 can be adjusted in length, thereby freely controlling the opening gap of the door 10 according to the animal sizes.

Through the gap control band 100, as a result, the animals capable of passing through the open gap of the door 10 can be selectively controlled in their size, thereby providing individual living spaces according to the animal sizes. If there are fights between animals, further, small animals can be moved to another place.

The locking pin module 200 is mounted on the other end of the gap control band 100 and has one pair of upper and lower pins 230 and 240. The upper and lower pins 230 and 240 are fixedly fitted to upper and lower holders 330 and 340 of the locking holder module 300 mounted on the door frame 11.

Further, the locking holder module 300 is mounted on the door frame 11 in such a manner as to be connected to the locking pin module 200, and in the same manner as the gap control band 100, the locking holder module 300 is mounted on the door frame 11 through fixing means like an adhesive, bolt, magnet, and suction pad, which is provided on the underside thereof.

Also, the locking holder module 300 is provided with the upper and lower holders 330 and 340 having the shape of a hole or hook that correspond to the upper and lower pins 230 and 240 of the locking pin module 200 to thus support the gap control band 100 to which the locking pin module 200 is coupled, so that the opening gap of the door 100 can be limitedly provided.

Figure 2A:
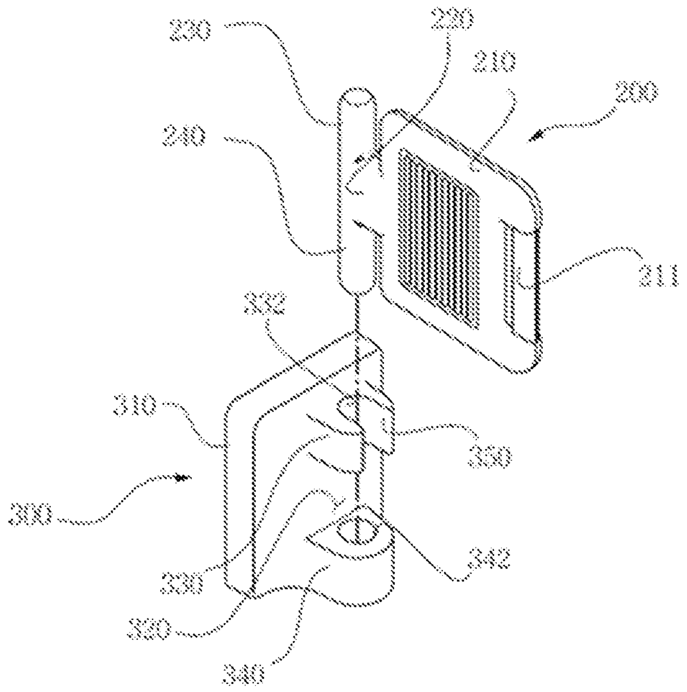
FIGS. 2A and 2B are perspective views showing a coupling structure between a locking pin module and a locking holder module of the opening gap control device according to the present invention.
Figure 2B:
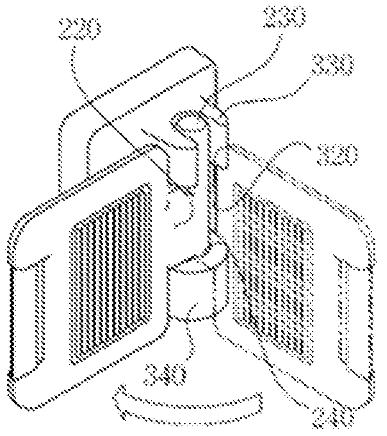

Referring to FIGS. 1 to 2*b*, the locking pin module 200 and the locking holder module 300 will be specifically explained. The locking pin module 200 includes a handle 210 having a band fastening portion 211 formed on one end thereof, a locking piece 220 protruding from the handle 210 and having a smaller size than a height of the handle 210, and the upper and lower pins 230 and 240 extended in a vertical direction from the locking piece 220 in such a manner as to be integrally connected to each other.

As shown, the locking pin module 200 is configured to allow the gap control band 100 to be connected to the band fastening portion 211 formed on one end of the handle 210 so that it can be used in a state of being connected to one side of the door 10. If the upper and lower pins 230 and 240 are fitted to the locking holder module 300, the handle 210 is exposed to one side of the locking pin module 200 so that it is easy to control locking and releasing through the handle 210.

Further, the locking pin module 200 includes the locking piece 220 protruding from the handle 210 and having a smaller size than the height of the handle 210 and the upper and lower pins 230 and 240 extended in a vertical direction from the locking piece 220 in such a manner as to be integrally connected to each other, so that if any one of the upper and lower pins 230 and 240 is fixedly locked onto the lower holder 340 of the locking holder module 300, the gap control band 100 can be restricted to the locking holder module 300.

On the other hand, the locking holder module 300 includes a fixed plate 310 mounted on the door frame 11, the upper and lower holders 330 and 340 protruding from the fixed plate 310 in such a manner as to be spaced apart from each other and having upper and lower pin holes 332 and 342 for restricting the upper and lower pins 230 and 240 thereto, a locking groove 320 formed between the upper and lower holders 330 and 340 to restrict the locking piece 220 thereto, and a slot 350 formed by incising the upper holder 330 to permit a longitudinal movement of the locking piece 220.

Referring to FIGS. 2*a* and 2*b*, a coupling structure between the locking pin module 200 and the locking holder module 300 will be explained. As shown in FIG. 2*a*, if the locking pin module 200 moves downward in a state where the upper and lower pins 230 and 240 are placed coaxially on the upper and lower pin holes 332 and 342, the upper and lower pins 230 and 240 are inserted into the upper and lower pin holes 332 and 342 of the upper and lower holders 330 and 340.

In this case, as shown in FIG. 2*b*, the locking pin 220 passes through the slot 350 incised on the upper holder 330 and enters the locking groove 320, so that when the door 10 is open, the locking pin module 200 swings around the upper and lower pins 230 and 240.

Like this, if the locking piece 220 swings at an angle that does not correspond to the slot 350 in the state where the upper and lower pins 230 and 240 of the locking pin module 200 are coupledly fitted to the upper and lower holders 330 and 340 of the locking holder module 300, the locking piece 220 is restrictedly inserted into the locking groove 320.

In specific, as shown in FIG. 2*b*, if the locking pin module 200 swings, the locking piece 220 does not correspond to the slot 350 of the locking holder module 300 at the angle thereof, and accordingly, the locking piece 220 is prevented from escaping in position, without any separate locking member. As a result, the locking state of the locking piece 220 can be prevented from being erroneously released by external impacts or the control of smart animals among the companion animals, and further, such a locking structure, which is capable of providing separation and coupling only at the given angle (the position of the slot 350) set in advance, can be ensured in safety.

Figure 3A:
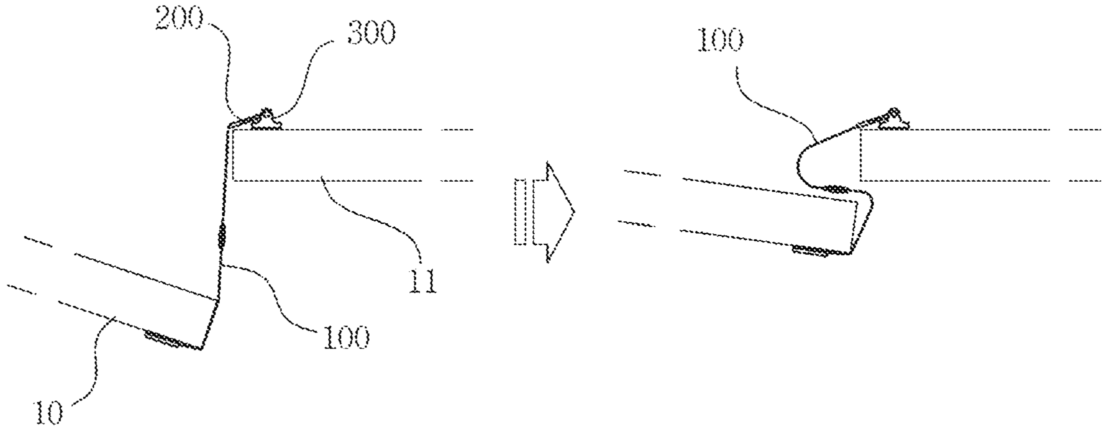
FIGS. 3A and 3B are top views showing other examples in the use state of the opening gap control device according to the present invention.
Figure 3B:
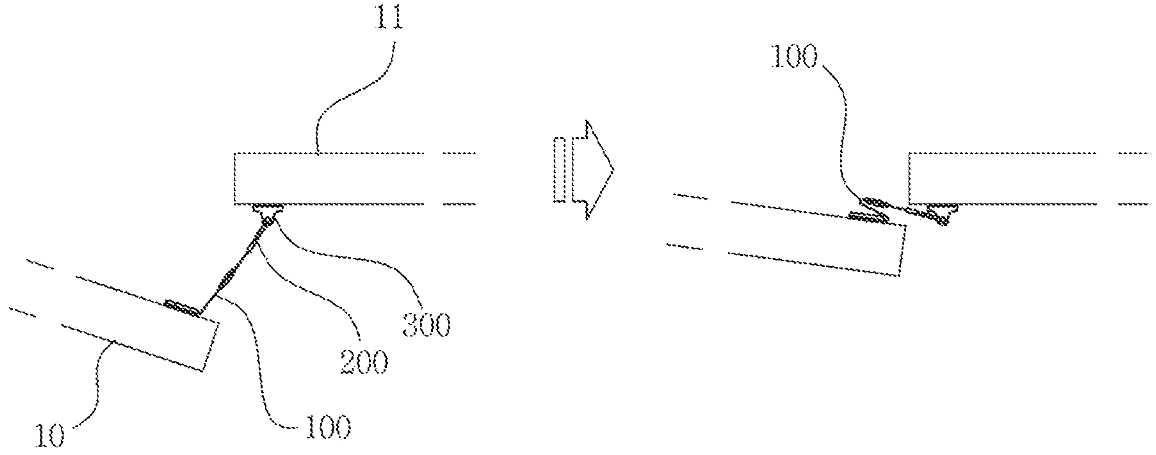

According to the present invention, on the other hand, the two way swinging door opening gap control device for controlling the movements of companion animals is configured to mount the gap control band 100 and the locking holder module 300 in the same direction as each other on the door 10 and the door frame 11, as shown in FIG. 1, but as shown in FIGS. 3*a* and 3*b*, the gap control band 100 and the locking holder module 300 may be mounted in different directions from each other on the door 10 and the door frame 11.

In specific, as shown in FIG. 3*a* or 3*b*, if the gap control band 100 and the locking holder module 300 are mounted in different directions from each other on the door 10 and the door frame 11, the opening gap of the door 10 can be controlled, and even if the door 10 is pushed by wind or external contact, further, the gap control band 100 is located between the door 10 and the door frame 11 to thus prevent the door 10 from being closed fully, so that it is possible for the animals to push or scratch the door 10 and thus open the door 10, thereby improving the conveniences in use.

Figure 4A:
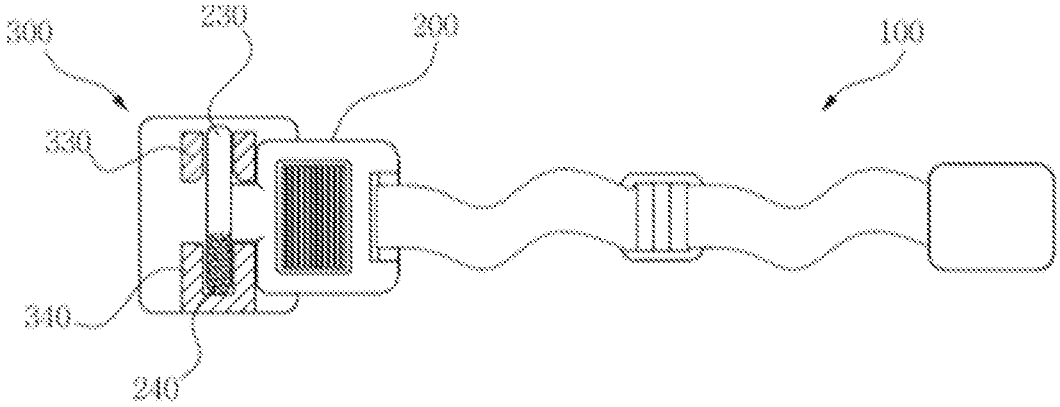
FIGS. 4A and 4B are front views showing examples in the coupled state of the locking pin module according to the position of the locking holder module in the opening gap control device according to the present invention.
Figure 4B:
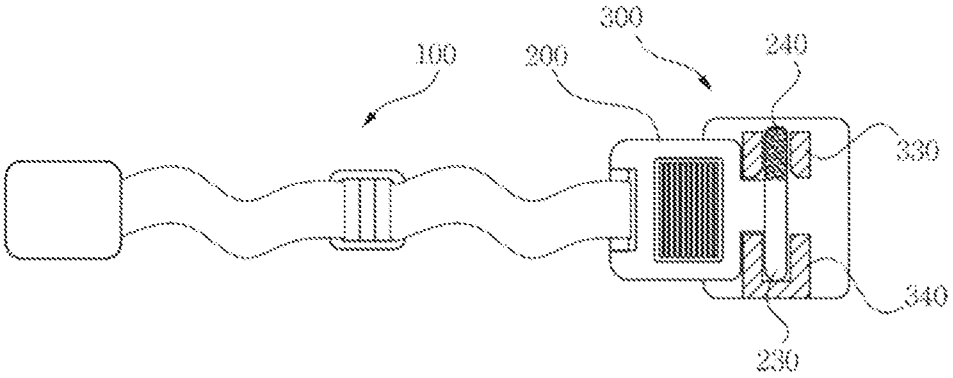

As shown in FIGS. 4*a* and 4*b*, in an installation condition where the locking holder module 300 is located on the right side and the gap control band 100 and the locking pin module 200 are located on the left side, the lower pin 240 is inserted into the lower holder 340, and in an installation condition where the locking holder module 300 is located on the left side and the gap control band 100 and the locking pin module 200 are located on the right side, the upper pin 230 is inserted into the lower holder 340. Accordingly, the installation condition is varied to selectively insert the upper and lower pins 230 and 240 into the lower holder 340 to thus allow the single locking pin module 200 to be provided for use in both direction installation conditions.

In specific, the upper pin 230 and the lower pin 240 are symmetrical up and down with each other, and even if the locking holder module 300 is changed in position to the right or left side, the upper pin 230 and the lower pin 240 are just changed in their installation direction. That is, the upper pin 230 and the lower pin 240 are selectively inserted into the upper holder 330 and the lower holder 340 and fixed in position thereto. Even in the case where the opening and closing direction of the door 10 is varied, even in the case where the attachment positions of the gap control band 100 and the locking holder module 300 are changed to each other, or even in the case where the installation position of the locking holder module 300 is changed in consideration of the interference with the surrounding structure, the same position fixing structure is provided, irrespective of the installation position or direction, thereby providing the opening gap control device available in both directions in various environments.

On the other hand, the thickness of the locking piece 220 is smaller than the diameter of the upper pin 230, and the width of the slot 350 is smaller than the diameter of the upper pin 230. The slot 350 permits the locking piece 220 to move in a longitudinal direction thereof but restricts the movement of the upper pin 230 in a transverse direction thereof.

Figure 5:
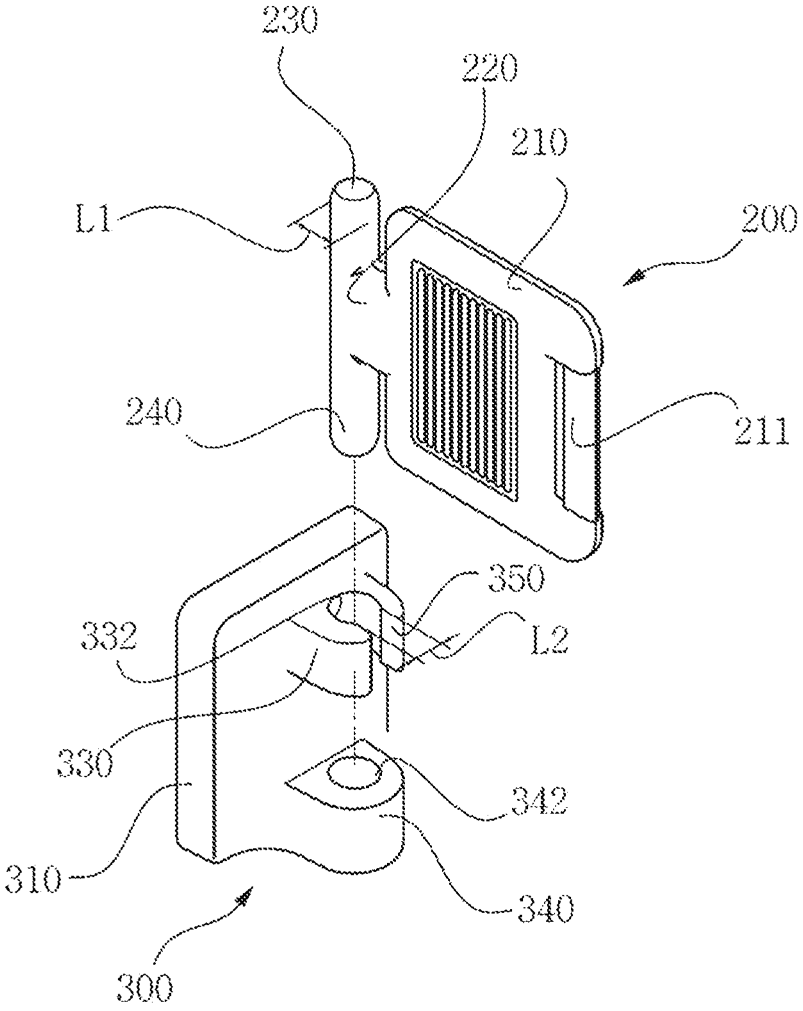
FIG. 5 is a perspective view showing an example where the size of the slot formed on the locking holder module is smaller than the diameter of an upper pin in the opening gap control device according to the present invention.

As the diameter L1 of the upper pin 230 is smaller than the width L2 of the slot 350, as shown in FIG. 5, the upper pin 230 that is inserted into the upper and lower pin holes 332 and 342 in the longitudinal direction thereof is prevented from escaping from the slot 350 open in a lateral direction to the outside, thereby making it possible to support the locking pin module 200, without any movement.

On the other hand, a head (not shown) is extended from top of the upper pin 230 to a size larger than the diameter of the upper pin 230 in such a manner as to be supportedly seated on top of the upper holder 330.

Figure 6:
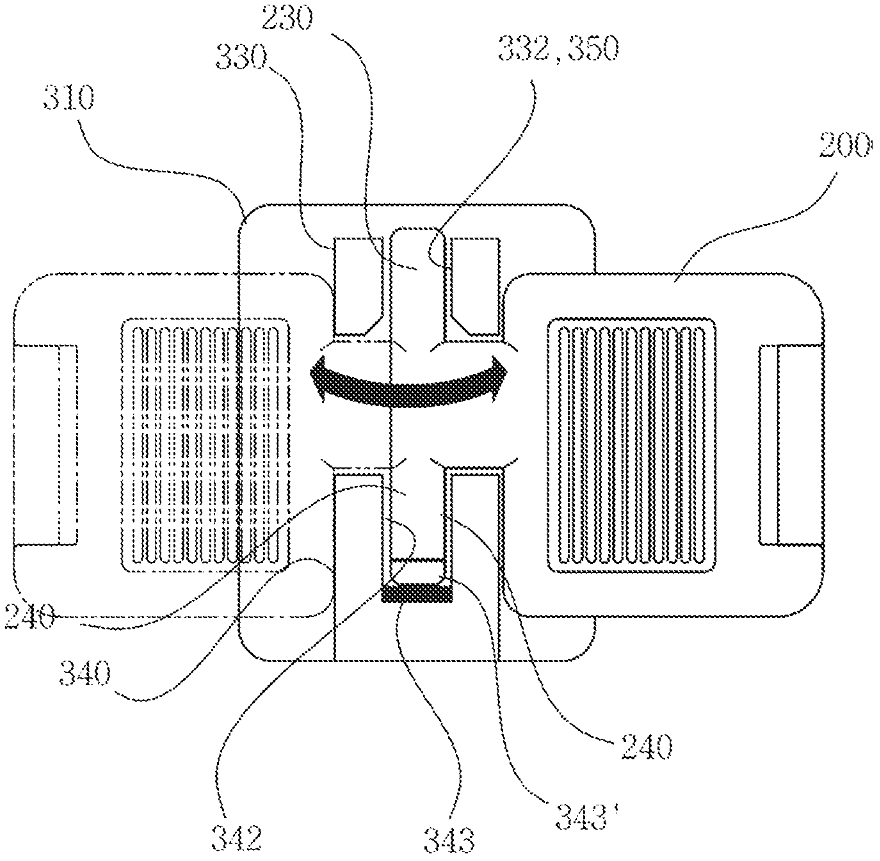
FIGS. 6 and 7 are front and perspective views showing two way swinging door opening gap control devices for controlling the movements of companion animals according to other embodiments of the present invention.
Figure 7:
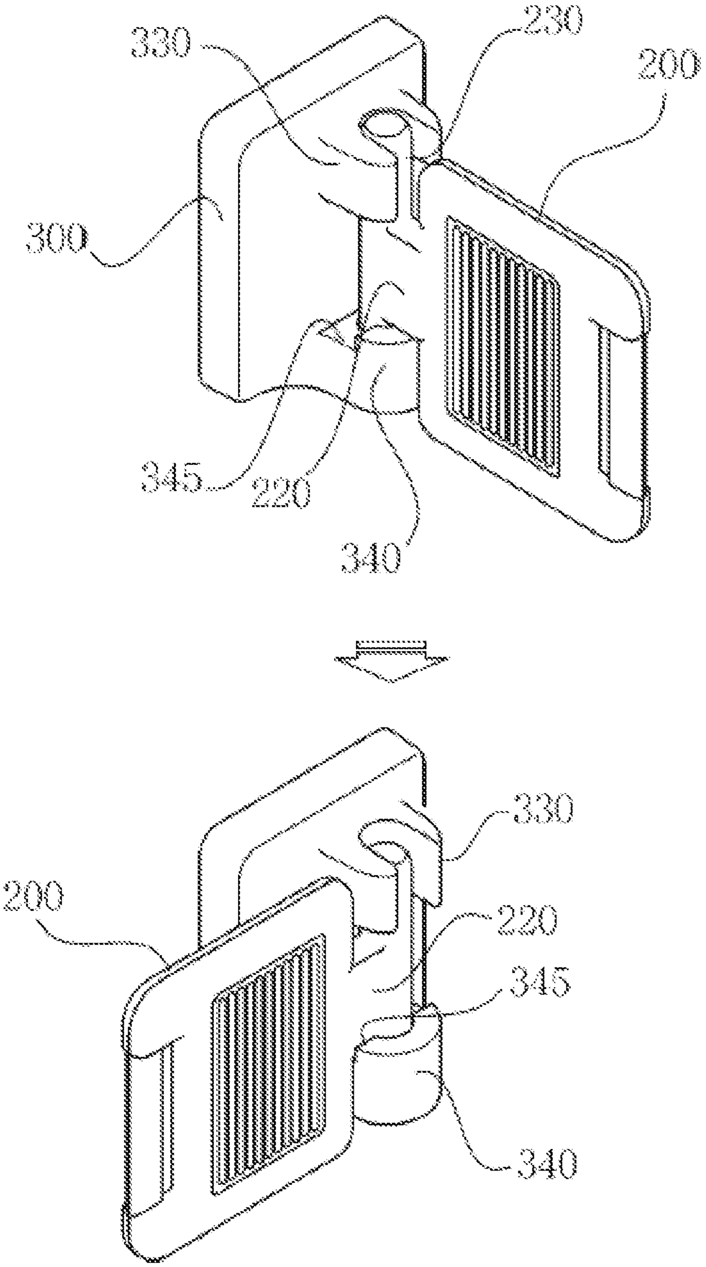

FIGS. 6 and 7 are front and perspective views showing two way swinging door opening gap control devices for controlling the movements of companion animals according to other embodiments of the present invention. As shown in FIG. 6, a magnetic material 343 is mounted on the bottom of the upper pin hole 342, and a passive magnetic material 343' that is attached to the magnetic material 343 by means of a magnetic force is mounted on the lower periphery of the lower pin 240 or the upper pin 230. When the lower pin 240 is inserted into the lower pin hole 342, accordingly, the attachment force between the magnetic material 343 and the passive magnetic material 343' prevents the locking pin module 200 from being easily separated from the locking holder module 300.

As shown in FIG. 7, the lower holder 340 has a locking groove 345 formed on the contact surface coming into contact with the locking piece 220, and the locking groove 345 engages with the locking piece 220 at a given angle. In this case, the locking groove 345 is formed at an angle that does not correspond to the slot 350.

If the locking pin module 200 swings in a state of being fastened to the locking holder module 300, accordingly, the locking piece 220 is descended by means of its self weight, engages with the locking groove 345, and lockedly fixed to the locking groove 345, so that so as to allow the locking pin module 200 to swing again, the locking pin module 200 has to be lifted up to release the locking state between the locking piece 220 and the locking groove 345, thereby greatly improving the stability in keeping the locking state.

The invention claimed is:

1. A two way swinging door opening gap control device for controlling an opening gap between a door and a door frame to thus prevent companion animals of given sizes or more from entering through the opening gap, the device comprising:

a gap control band whose one end is located on the door and length is adjustable;

a locking pin module located on the other end of the gap control band and having a handle having a band fastening portion formed on one end thereof, a locking piece protruding from a central portion of the handle in a height direction of the handle and having a smaller size than a height of the handle, and upper and lower pins extended in a vertical direction from the locking piece in such a manner as to be integrally connected to each other; and a locking holder module located on the door frame and having upper and lower holders adapted to restrict the upper and lower pins of the locking pin module thereto, wherein the locking holder module comprises:

a fixed plate-mounted on the door frame;

the upper and lower holders protruding from the fixed plate in such a manner as to be spaced apart from each other;

the lower holder has a circular lower pin hole to restrict the lower pin thereto;

the upper holder has a circular upper pin hole and has a slot, wherein the circular upper pin hole and the slot are integrally connected to restrict movement of the upper pin to the upper holder in a transverse direction thereof and to permit a longitudinal movement of the locking piece; and a locking groove formed between the upper and lower holders and configured to restrict the locking piece thereto.

2. The device according to claim 1, wherein if the locking piece swings at an angle that does not correspond to the slot in the state where the upper and lower pins of the locking pin module are fitted to the upper and lower holders of the locking holder module, the locking piece is inserted into the locking groove to restrict the locking piece.

3. The device according to claim 1, wherein in an installation condition where the locking holder module is located on a first side and the gap control band and the locking pin module are located on a second side, the lower pin is inserted into the lower holder, and in an installation condition where the locking holder module is located on the second side and the gap control band and the locking pin module are located on the first side, the upper pin is inserted into the lower holder, so that the installation condition is varied to selectively insert the upper and lower pins into the lower holder to thus allow the single locking pin module to be provided for use in both direction installation conditions.

4. The device according to claim 1, wherein the circular upper pin hole is provided with a magnetic material mounted on the bottom thereof, and the lower pin or the upper pin is provided with a passive magnetic material mounted on the lower periphery thereof in such a manner as to be attached to the magnetic material by a magnetic force generated by the magnetic material.

5. The device according to claim 1, wherein the lower holder has a locking groove formed on a contact surface coming into contact with the locking piece, and the locking groove engages with the locking piece at a given angle.

6. The device according to claim 1, wherein:

the locking piece passes through the slot of the upper holder and enters the locking groove, so that when the door is open, the locking pin module swings around the upper and lower pins;

when the locking piece swings at a given angle that does not correspond to the slot in the state where the upper and lower pins of the locking pin module are fitted to the upper and lower holders of the locking holder module, the locking piece is restrictedly inserted into the locking groove; and when the locking pin module swings, the locking piece does not correspond to the slot of the locking holder module at the given angle, and the locking piece is prevented from escaping the locking groove.

* * * * *